(12) United States Patent
Logan et al.

US009426627B1

(10) Patent No.: US 9,426,627 B1
(45) Date of Patent: Aug. 23, 2016

(54) QUEUE INFORMATION AND PREDICTION SYSTEM

(71) Applicant: Twin Harbor Labs, LLC, Plano, TX (US)

(72) Inventors: James D Logan, Candia, NH (US); Richard A Baker, Jr., West Newbury, MA (US)

(73) Assignee: Twin Harbor Labs, LLC, Plano, TX (US)

( * ) Notice: Subject to any disclaimer, the term of this patent is extended or adjusted under 35 U.S.C. 154(b) by 0 days.

(21) Appl. No.: 15/134,365

(22) Filed: Apr. 20, 2016

Related U.S. Application Data

(60) Provisional application No. 62/150,317, filed on Apr. 21, 2015.

(51) Int. Cl.
| | |
|---|---|
| *H04L 29/06* | (2006.01) |
| *H04W 4/02* | (2009.01) |
| *H04L 29/08* | (2006.01) |
| *H04H 20/08* | (2008.01) |
| *H04B 17/318* | (2015.01) |

(Continued)

(52) U.S. Cl.
CPC ............. *H04W 4/028* (2013.01); *H04B 17/318* (2015.01); *H04H 20/08* (2013.01); *H04L 67/22* (2013.01); *H04W 4/008* (2013.01); *H04W 4/027* (2013.01); *H04W 84/12* (2013.01)

(58) Field of Classification Search
CPC ........................... H04W 4/02; H04L 29/08108
USPC ........... 455/414.3, 404.2, 405, 456.1; 705/1.1
See application file for complete search history.

(56) References Cited

U.S. PATENT DOCUMENTS

| | | | |
|---|---|---|---|
| 6,023,681 | A | 2/2000 | Whitt |
| 6,842,620 | B2 | 1/2005 | Smith et al. |
| 8,208,943 | B2 | 6/2012 | Petersen et al. |

(Continued)

FOREIGN PATENT DOCUMENTS

| | | |
|---|---|---|
| CN | 103106064 A | 5/2013 |
| CN | 104392610 A | 3/2015 |

(Continued)

OTHER PUBLICATIONS

Lavi Industries, "QtraciQ", web page found at http://qtrac.lavi.com/people-counting, downloaded on Mar. 17, 2016.

(Continued)

*Primary Examiner* — Chuck Huynh
(74) *Attorney, Agent, or Firm* — Richard A. Baker

(57) ABSTRACT

Queue Information & Prediction System (QIPS) uses the probability of queue existing in a given venue to assess the queue time. The instantaneous queue time for a location may be determined using Bluetooth, Wi-Fi, or other wireless networks. QIPS uses the distances from signal strengths along with venue characteristics to determine an estimated queue time. Using queue probability for a venue and the instantaneous queue time for the same area QIPS may generate a Queue Decision Window (QDW). The QDW is a period of time leading up to a transaction or a consumption of a service. QIPS sorts through information surrounding a venue where crowds as well as queues may exists to determine queue time. Knowing the approximate queue time for transactions and consumption of services is helpful for consumers to manage their time.

20 Claims, 9 Drawing Sheets

(51) Int. Cl.
*H04W 4/00* (2009.01)
*H04W 84/12* (2009.01)

(56) References Cited

U.S. PATENT DOCUMENTS

| | | | |
|---|---|---|---|
| 8,406,770 | B2 | 3/2013 | Smith |
| 8,711,737 | B2 | 4/2014 | Kandekar et al. |
| 8,768,867 | B1 | 7/2014 | Thaeler et al. |
| 2006/0095677 | A1 | 5/2006 | Hakura et al. |
| 2007/0127690 | A1 | 6/2007 | Patakula et al. |
| 2007/0155385 | A1 | 7/2007 | Balasubramanian et al. |
| 2008/0059274 | A1 | 3/2008 | Holliday |
| 2009/0281817 | A1* | 11/2009 | Ferrara .......... G06Q 10/06 705/1.1 |
| 2012/0221276 | A1 | 8/2012 | Schmidt et al. |
| 2014/0070946 | A1* | 3/2014 | Ambrefe, Jr. ........ H04W 4/02 340/541 |
| 2015/0032556 | A1 | 1/2015 | Evans et al. |

FOREIGN PATENT DOCUMENTS

| | | |
|---|---|---|
| EP | 2008458 A2 | 12/2008 |
| IT | TO20050138 A1 | 9/2006 |
| WO | 2010042973 A1 | 9/2009 |
| WO | 2011003461 A1 | 1/2011 |

OTHER PUBLICATIONS

Nomi, "Queue Management", web page found at http://www.nomi.com/applications/by-type/queue-management/, downloaded on Mar. 17, 2016.

Advanced Technolgies, "Q-Count", web page found at http://www.advancedtechnologies.gr/PeopleCountingQCountEn.php, downloaded on Mar. 17, 2016.

"Project Ubertooth", web page found at http://ubertooth.blogspot.com/2012/11/soyouwanttotrackpeoplewith.html, downloaded on Nov. 11, 2015.

Bulut, Muhammed, et al, "LineKing: Crowdsourced Line Wait-Time Estimation using Smartphones", 4th International Conference, MobiCASE 2012, Seattle, WA, USA, Oct. 11-12, 2012.

Wang, Yan, et al, "Tracking Human Queues Using Single-Point Signal Monitoring", MobiSys '14, Jun. 16-19, 2014, Bretton Woods, NH.

"WhatsBusy", web page found at http://www.whatsbusy.com/product.html, downloaded on Mar. 18, 2016.

TouringPlans.com, "Disney World Lines from TouringPlans.com", web page located at https://itunes.apple.com/us/app/disneyworldlinesfromtouringplans.com/id411091283?mt=8, downloaded on Feb. 19, 2015.

VersaEdge Software, LLC, "Disney World Wait Times Free", web page located at https://itunes.apple.com/us/app/disneyworldwaittimesfree/id321601474?mt=8, downloaded on Feb. 19, 2015.

Qgo, "ESkiMo Hochficht Liftwartezeit", web page located at https://play.google.com/store/apps/details?id=com.qgo.askimo, downloaded on Feb. 19, 2015.

"Eskimo Ski App for Android and iPhone", web page found at http://www.verenahumaus.com/eskimo.html, downloaded on Feb. 19, 2015.

Ku, Tony, "6 free apps for skiers", Vancouver Sun, Jan. 22, 2015.

TrailMap, "iTrailMap Apps", web page found at http://www.itrailmap.com/apps/, downloaded on Feb. 19, 2015.

Lindsey, Joe, "Vail's EpicMix App Brings Location Tracking, Social Networking to Ski Slopes", WIRED Sep. 1, 2010.

* cited by examiner

Figure 4A Time T(0)
App user enters the queue
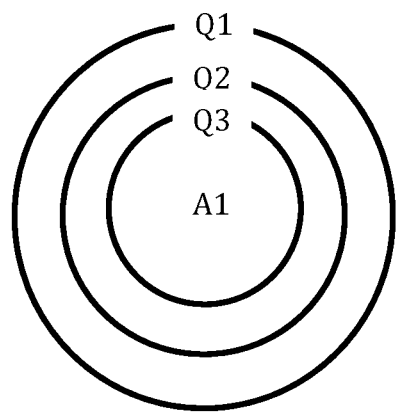
Figure 4B Time T(1)
App user moves forward in the queue
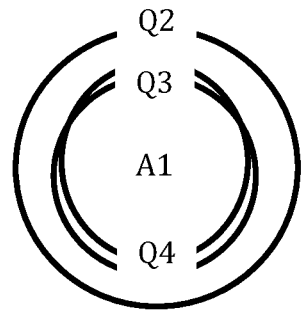

Figure 4C Time T(2)
App user moves forward in the queue
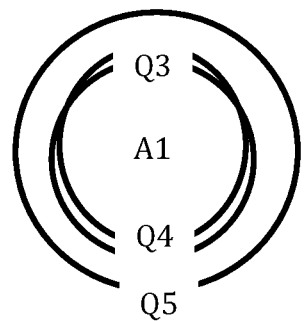
Figure 4D Time T(3)
App user moves to head of the queue
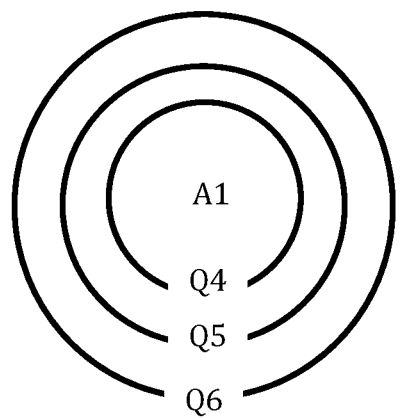

Figure 5A Time T(0)
App user 1 enters the queue
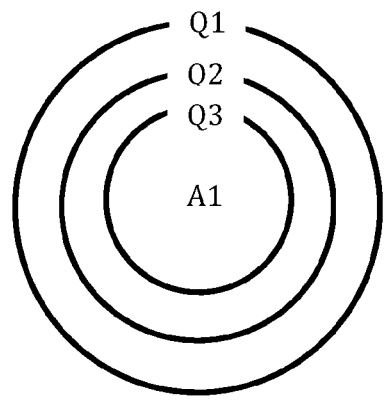
Figure 5B Time T(1)
App user 1 moves forward in the queue
App user 2 enters the queue
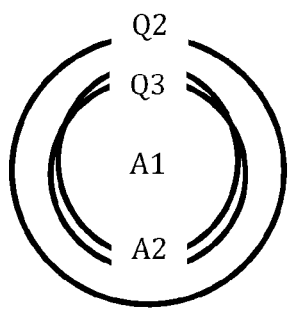

Figure 5C  Time T(2)
App user 1 & 2 moves forward in the queue
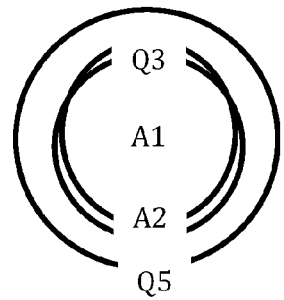
Figure 5D  Time T(3)
App user 1 moves to head of the queue
App user 2 moves forward in the queue
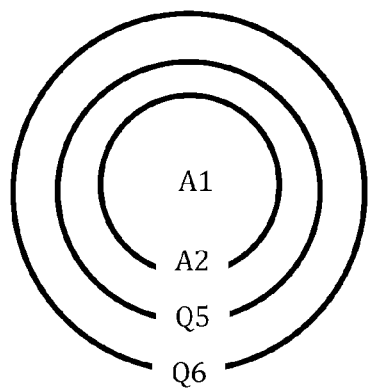

QUEUE INFORMATION AND PREDICTION SYSTEM

RELATED APPLICATIONS

This patent application is a non-provisional application of, and claims the benefit of the filing dates of, U.S. Provisional Patent No. 62/150,317 filed on Apr. 21, 2015 entitled Queue Information & Prediction System. The disclosures of this provisional patent application is incorporated herein by reference.

BACKGROUND

1. Field of the Invention

The present invention is directed to queue monitoring and prediction systems and is more specifically related to the tracking and predictions of queue length using crowd sourced smart phones.

2. Description of the Related Art

While there are systems to gather and present information regarding traffic congestion, for instance the Waze app or the traffic feature built into Apple Maps, there is no similar system that collects information about the queues that form in many public venues.

As a result, a couple might rush through dinner to get to a movie theatre thinking there would be a line to get in, only to find the theatre had very light traffic that night. Or a driver might pull off the highway to get a cup of coffee only to find that there was a five minute line inside the shop and a similar one in the drive through line—yet unbeknownst to the driver the coffee shop on the other corner had no line. Or a shopper might move across the grocery store to check out only to find a long line—a fact that if known in advance might have allowed that person to shop for some other items.

Queues form all the time at public venues. Traffic at public venues is variable and unpredictable in the short run and sometimes the long run as well. As a result, staffing and facilities are deployed so as to meet a level of demand below peak demand (as it would be too expensive to staff for peak demand) and a result queues form from time to time. At some level, the establishment balances the cost of extra staffing against the expressed pain customers feel from standing in line.

Queues, however, do come and go, for instance at a popular coffee shop, where there might be seven people in line in one minute and five minutes later, none. When queues form customers either balk (leave the line) or wait in line. Perhaps more staffing is deployed. But eventually, queues dissipate and over longer periods of time, "supply" (e.g. cashiers, attendants) matches "demand" (customers needing service).

The interests of service providers and consumers, from an informational point of view, are not always aligned. Businesses might wish to not broadcast the presence of queues (so as not to discourage customers), while consumers would very much like to know about the existence of current queues, or the probability of a one forming, in the time it would take them to get to the establishment.

Once a consumer has made an investment in consuming a service (researching the service, driving to the establishment, selecting items) it becomes harder to balk at a line. Ideally, the consumer would like to know about the probability of a queue coinciding with their consumption of the service before they start to make those investments. It may be beneficial if the consumer somehow compensated for having to wait in line.

Some decisions are made strictly based on queue length at that moment. For instance, if one is at the back of a grocery store, it might be useful to know how long the lines are at the checkout counter right then and there. If they are long, one might shop for a few more items but if they are short, it might be best to hustle up and catch a cashier while the lines are short. In this case, a decision is largely made on the queue at that very moment.

Currently, there are systems, such as described in Yan Wang, et al's paper "Tracking Human Queues Using Single-Point Signal Monitoring", that employ the use of iBeacons at cash registers. These systems can detect smart phones nearby and assemble that data into queue information. The drawback to this system is that the information is collected and owned by the establishment. There is no method to distribute it to the public and no incentive to do so. Furthermore, it is not a universal system with queuing data available for all establishments—just those that install iBeacons.

Another system, described in "LineKing: Crowdsourced Line Wait-Time Estimation using Smartphones" by Muhammed Fatih Bulut, et al, requires users to install an app, which then looks for the presence of Wi-Fi signals associated with a specific venue. Upon sensing such signals, the system assumes the user has arrived at the venue then tracks the total time that the signal can be received. For each visit to a venue, the system tracks the total time spent in range of the Wi-Fi signal. This time is assumed to be the combined queue and service time.

The drawbacks to this system are that it cannot separate out the waiting time from the service time. So a ten minute to get a table cannot be separated from the hour spent at that table. The system also does not report any data until the app user has transited in and out of the venue. That is not helpful to someone who needs to make a decision moments after the app-user enters the queue.

A problem related to queuing is one of crowds in general. For example, a family might wish to go to the beach on a nice day but if the beach is too crowded they might wish to go somewhere else. If a restaurant is full but still has no queue per se, a customer may wish to go somewhere else due to the anticipated noise or slow service. Or a crowded movie theatre might be considered undesirable and thus something to avoid if a person could find out before buying a ticket. Ski lift lines are another location where queue length is important to the skier.

On the other hand, a crowd might be an attractive attribute at a different location and different time. For instance, it might be that one bar or nightclub might be preferable to another if the crowd was larger. Similarly, it might be useful to know if a certain pep rally or other public social functions had drawn enough of a crowd to be worth attending. Furthermore, it would be useful, if invited to a private party, whether a certain number of people appeared to be there.

This invention creates an information system to present consumers with real and predicted data about queue behavior at a localized level. Using a localized level allows consumers to make alternative plans and new decisions before they are faced with having to get in line and study the queue behavior themselves. It further serves to characterize crowds in the same way thus allowing users the opportunity to avoid crowds or seek them out, as the case may be.

The invention allows for the real-time collection of queuing information, the analysis of such information in order to predict future queue behavior, and presenting such information to consumers in a simple, fast way that will allow to make new, incremental decisions. For businesses if offers an opportunity to be apprised of their queue behaviors and to compensate consumers for certain queue outcomes.

BRIEF DESCRIPTION OF THE DRAWINGS

FIG. 4A illustrates the distance information when the user enters the queue.
FIG. 4B illustrates the distance information when the user moves forward in the queue.
FIG. 4C illustrates the distance information when the user moves forward again in the queue.
FIG. 4D illustrates the distance information when the user reaches the head of the line.
FIG. 5A illustrates the distance information when the user A1 enters the queue.
FIG. 5B illustrates the distance information when user A1 moves forward in the queue and use A2 enters the queue.
FIG. 5C illustrates the distance information when user A1 and user A2 move forward again in the queue.
FIG. 5D illustrates the distance information when user A1 reaches the head of the line and user A2 moves forward.

DETAILED DESCRIPTION

The Queue Information & Prediction System (QIPS) may rely on an application or other software and hardware used by customers. A QIPS application may run continuously in background mode on a customer device. It would perform two basic functions—collecting experiential queue information to be passed to the cloud and used by the community, and alternately, to be given information by the QIPS system, based on travel plans, concerning the queues are likely to be encountered in those travels. By determining the number of people in a given queue and multiplying by the average service time once a person reaches the front of a queue the total queue time may be computed. Alternatively, an application on a cell phone of a person in the queue can subtract the time leaving the queue from the time entering the queue to determine the queue time.

Figure 6:
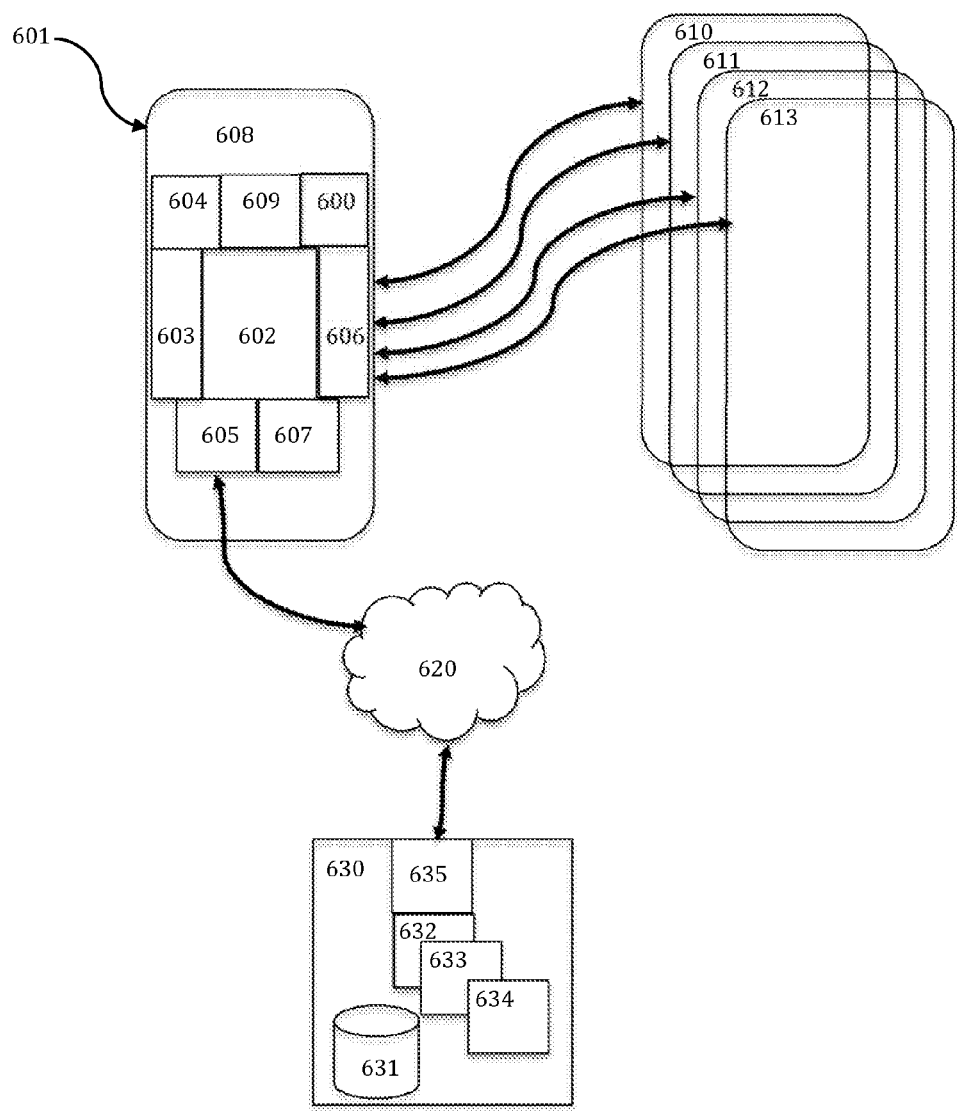
FIG. 6 illustrates a hardware configuration with a smart phone and a cloud server.

As seen in FIG. 6, a smart phone 601 that may operate the QIPS system may have a special purpose processor 602 for operating a cellular phone 601, a memory 603, an accelerometer 604, a GPS module 609, a microphone 600, an interface to the cellular network (cellular transceiver) 605, a Wi-Fi transceiver 607, a Bluetooth transceiver 606, and a display screen 608. The phone 601 may be an iPhone device running iOS or an iPad. It could be a device running the Android operating system or other similar device.

The QIPS system communicates with a cloud server 630 through either WiFi, Cellular or through Bluetooth to the interne 620. The cloud server 630 could be one or more special purpose, high speed processors 632, 633, 634 for collecting information from each QIPS app running on a smart phone and storing that data into a database 631. The cloud server 630 has a high speed internet transceiver (or it could communicate directly via Wi-Fi or cellular to the QIPS app) 635. It needs a large storage capacity and software that analyzes the data to monitor and predict queue formation at various venues. In some embodiments, the cloud server is distributed across the world, with local incarnations of the server handling local queues.

While it is possible that queuing information might be distributed to consumers not actively collecting queuing information themselves, it is anticipated that one must partake in the data gathering aspect in order to enjoy the benefits of receiving the queue data.

A Queue Decision Window (QDW) is a period of time leading up to a transaction or a consumption of a service. For example, checking out at a grocery store or paying for a coffee both have QDWs during which the consumer can make alternate plans. For example, if a consumer was aware of the probability of a long line at a movie theatre, they might choose a different activity. In one embodiment, the decision is based on a probability.

A QDW may involve more factors than a single probability for a single queue. A QDW may involve multiple probabilities from multiple queues. For example, a user may be driving to work in the morning but would like to stop for coffee on the way to work. In this example, two queues may be present on the way to work. Both queues are on the way to work but the second queue has a longer QDW than a first queue. A user may bypass the first queue on the way to work and stop at the second queue to get coffee, saving time.

In another example, the decision is based on multiple factors, these factors include probability and a reading of instantaneous queue time. Using data from users actually located in the queues an instantaneous queue time may be calculated.

Location Determination

Each QIPS equipped phone would have the ability to use any number of various means to detect where the user was at most times. Such systems are sometimes built into the operating system of a smart phone. For example, Apple uses the Core Location framework (CoreLocation.framework). This framework allows for the region around a Bluetooth beacon to be identified (note that while Bluetooth is used throughout this document, it is envisioned that one of ordinary skill in the art could replace Bluetooth with WiFi or other radio or similar technology). The CLBeacon class represents a beacon that was encountered during region monitoring. A CLFloor object specifies the floor of the building on which the user is located. The CLGeocoder class provides services for converting between a coordinate (specified as a latitude and longitude). The CLRegion class defines an abstract area that can be tracked.

Electronic hardware allows operating systems to accurately sense location with low power consumption. For example, the Broadcom BCM4771 GNSS SoC 602 with on-chip sensor hub enables consumers to more accurately track and manage location data while consuming less power than traditional architectures. In fact, the BCM4771 602 improves the accuracy of distance measurements while consuming 75 percent less power than existing GNSS solutions. QIPS will operate with greater accuracies and less power consumption as location hardware continues to improve. Hardware may use GPS 609, cell phone tower signals, iBeacons, Wi-Fi signals, and like means to determine location.

QIPS may periodically look at the location of the user. If the user were at known locations, such as the office or at home, the check-ins would be less frequent. Once the system understood that the user was changing locations, by virtue of seeing a difference in location readings, the system would access the location data more often. If the user started to ride on a vehicle, as determined by travel speed, the check-ins would be less frequent. Once the vehicle stopped, however, and the user was on foot, the system would become more active as it looked for the user entering an area where queues are present. A "public venue" may be an area where queues are present.

If the user never got on in a vehicle in the first place, for instance if walking down a city street after leaving an office, the system would immediately start frequent check-ins to determine location. QIPS may invoke a pedometer function in order to track footsteps in order to get a more refined picture of how the user is traveling.

QIPS may use inertial navigation combined with maps of cities or inside specific buildings. Inertial navigation preserves the battery life of the user's device while still providing an accurate location. Microelectromechanical systems (MEMS) have become standard in many devices and allow sensors (e.g. accelerometers 604, gyroscopes) to calculate location without draining battery life from triangulating a GPS signal. In one embodiment, QIPS could be enabled only when the user is on foot, using the accelerometer 604 to see if the user is walking. Or certain venues could be geofenced, and QIPS only enabled when within a geofenced area.

QIPS may interface with existing inertial navigation software in order to pinpoint the location of queues with respect to the user's device. For example, QIPS may interface with PathSense to track the location without severely draining the battery of a user's iPhone. To find the location of the iPhone 601 via inertial navigation with PathSense the phone may run the code:

```
{
    psLocationManager=[[PSLocationManager alloc] init];
    psLocationManager.delegate=self;
    [psLocationManager startUpdatingLocation];
}
```

Once the location is updated, QIPS may process queues proximate the user's iPhone.

Entering a Venue

GPS and other such readings would give a good approximation as to where the user was before entering a building. QIPS may try to determine the precise moment the venue was entered. Several sensing means could be employed, and combined, in order to deduce the moment of entry. Note, that many of these would require comparing such sensing data to a database of typical "entry" sensor readings from such venue.

One sensor means QIPS could employ would be to look for Wi-Fi signals related to the venue and likely emanating from the establishment and watch how such signal strength increased upon entering the building. Using the frequency and signal level from a wireless source, such as Wi-Fi, the distance may be calculated. Below is Java code showing how this calculation may work:

```
public double calculateDistance(double signalLevelInDb,
    double freqInMHz)
{
    double exp;
    exp=(27.55−(20*Math.log 10(freqInMHz))+Math.abs
        (signalLevelInDb))/20.0;
    return Math.pow(10.0, exp);
}
```

Pedometer data could provide a further hint that a building was entered. Footsteps from a car just parked in a parking lot to a venue's door, for instance, would be relatively steady and in a relatively straight line. Upon reaching the door, however, the user might stop, and even turn, in order to open the door. In some cases, a user might have to turn and change direction while walking through a set of sliding doors.

In many venues, such as restaurants, the user would stop upon entering the venue and taking a few steps. Others, such as a grocery store, the user might keep walking right through the sliding doors and not stop at all. The usual pattern associated with each venue would be stored in a Venue Database.

Another method of discerning entry would be to record sounds with the microphone 600. Over time, a database of typical sounds inside and just outside a location could be accumulated and used to discern the moment of entry. QIPS may also collect data from other applications on a customer's phone 601. For example, QIPS may determine location based on data from the ShopKick application on a user's phone. ShopKick uses location services to determine when a customer is near a store. QIPS may use the data from ShopKick to determine queues located in and around that store.

For phones 601 being held in hand by the user the camera lens, light sensors, or even temperature sensors on the phone could be used to distinguish between inside and outside. A photodiode or like device may determine if the phone is outside or inside. If location distinction techniques are not available or applicable, then standard GPS data or other location means may be used to approximate the time and point of entry.

Often a public venue is located within a larger facility such as a mall, which presents challenges for using GPS 609 to locate the specific venue to which the user is traveling. Common solutions to this problem are to use pedometer functionality, including accelerometer 604 readings to get bearings, to construct a "bread crumb" trail to see where the user has gone within the structure. In addition, various indoor navigation systems (iBeacons, Shopkick, and RF triangulation setups) are coming to market that will give a smart phone a clearer idea as to the location of a user in a large building.

The same sensor means described above could be employed to detect entry to such venues located in malls and similar structures.

Location Determination Inside a Venue

Once arrival at a location had been established, however, other app sensors would be employed to glean additional locational information as to where in the building the user was. This is important as there might be multiple queue locations in a given building, such as stores in a mall or the ticket line and popcorn line in a movie theatre.

The application may access its pedometer function and use readings off its various sensors including accelerometer, gyroscope, or compass. With data regarding footsteps, compass directions, and accelerometer readings giving directional and speed data, inferences could be made as to where the person had traveled indoors. Customers may be tracked via Wi-Fi or Bluetooth beacons to determine indoor location. Many chips now support indoor location systems (e.g. Broadcom BCM4752). These chips interface with other sensors, such as a gyroscope, magnetometer, accelerometer 604, and altimeter. The ability to interface allows these chips to act as a pedometer with high resolution. It simply has to take note of your entry point (via GPS 609), and then count your steps (accelerometer 604), direction (gyroscope), and altitude (altimeter).

The app would then the user's movement in order to deduce where the user was inside a venue.

In the case of the theater example for instance, the database would note that the ticket queue formed about 15-20 paces south-west from the door. And furthermore, that there was often a queue at the popcorn stand, some 10 paces to the north of that queue.

When a user entered a queue the walking motion would taper off and be replaced by no motion, a shuffling motion, or a combination of both. Upon receiving service, the pedometer would see a new set of walking actions. Over time, the app and associated server software would deduce after seeing multiple persons apparently standing in a line at roughly the same location within a venue that such an interior location represented a queue location. After making such a designation, the app in the future could more assuredly assume that a user was in a queue when the user's motion came to a halt at such location.

In addition, the app could benefit from explicit user input concerning where within a venue queues formed. That is, users could pull out their phone, or work with an associated app on a smart watch, and tell the app when they were standing in a queue. This could be for purposes of helping the app to understand where queue locations were inside a venue, or even to help the app time the length of the wait if the user designated the beginning and the end of their wait. Furthermore, the app could serve as a stopwatch for users giving them the time they waited in line and storing such personal experience data later use by the user.

Information on indoor movement, then, would be combined with metadata from the Venue Database 631 concerning where within the venue the queues were typically located (see below regarding databases). If the app sensed that a person was standing roughly where queues were known to form in the past, the probability of the user being in a queue would increase.

If the user pulled their phone 601 out of their pocket to use it, the camera could be activated by the app and take a picture of the ceiling of the establishment. This ceiling picture could be compared to other images captured at the same location when users were presumably in line and used to confirm that indeed the user was in a queue and not standing off in another area talking to a friend. The app may be designed to store the photographs in a temporary location and then delete the photos once the user leaves the queue to alleviate any privacy concerns.

Venue Database 631

The QIPS system would rely on a database 631 of public venues. Such a database of public venues could be compiled by collecting information from online public databases such as Google Maps that contains the names and location of many businesses. Other databases, such as online Yellow Pages, could be accessed to build the database. In some cases, these databases contain metadata concerning the venue-type. Sometimes, the type of venue could be deduced by the name, for instance if the name had the word "bakery" in it. In addition, the QIPS database could be built up from explicit user contributions. Such explicit user contributions could be anonymous to protect the user's privacy or could be personalized to make a better experience for the individual.

Contributions to the database 631 could also be made by monitoring the movements of users. The QIPS could deduce when a user had arrived at a non-work/non-home location if the user spends a limited amount of time at that location and if enough users had entered such a location in the past spending similar amounts of time. If so, it would be deemed to be a public location (versus a friend's house or another office building) and entered into the database 631. The address could be deduced by location and the name of the business could be associated with it by searching a business directory for a business associated with that address.

By monitoring multiple users enter a venue over time, QIPs could deduce information regarding how the entry-sensor data behaves upon arrival. Such data could be used to determine when subsequent users had entered the venue.

Most significantly, the QIPS database 631 would contain a list of the UPS coordinates for all such public locations. Other metadata may include:
1. Queuing Locations within the Venue—the approximate location within each venue, typically expresses as a travel distance from a singular entrance inclusive of hallways and including turn information. The existence of secondary queues would be noted as well (e.g. popcorn line in a movie theatre).
2. Queue Behavior—Queue detection techniques would be used to detect queues and queue behavior at each location with such information being stored in the database 631.
3. Queue Standard Metadata—Individual queuing events would each have metadata associated with them, such as date, time of day, the weather that day, and traffic conditions as noted in other apps such as Waze.
4. Special Queue Metadata—A database 631 could also contain temporal information, gleaned from other on-line sources. In the case of a theatre that might be what movies were playing, tides at the beach, or specials at a restaurant. Such temporal information could also be associated with the queue.

Detecting Other Phones 610, 611, 612, 613

It is now common for modern iOS phones and many Android phones, by default, to continuously emanate BLE signals containing the BD_ADDR of these phones. For applications not using Bluetooth, the MAC address, SID, or like identifier may be used. The user's phone 601 could use advertising mode to find other devices 610, 611, 612, 613 in the area. This should be able to locate every device that accepts advertising packets in a fraction of a second. The basic protocol is that we broadcast an advertising packet and every device that allows responses will respond with their address. Class 1 BLE signals may travel up to 300 feet but most phones and consumer electronics employ Class 2 with signals that may only reach 33 feet. These distances may be much shorter distances when traversing through walls, across disturbances, or other means which attenuate the signal.

QIPS may use a phone's BLE system 606 to detect these BLE signals, and thus these other phones 610-613 around the user's device, by reading their identifying signal. QIPS system will not know who these users are, other than their Bluetooth identifiable information such as their BD_ADDR associated with the user's device. However, metadata may be added to this standard.

In addition, the phones 610-613 being "seen" by the QIPS phone 601 do not necessarily have to have the QIPS application installed. They are being seen by virtue of the fact that they are emanating their identifiers. However, in order to see people in most queues it would be necessary to have enough QIPS-equipped phones being used to make it likely that at least one member of the queue has a QIPS equipped phone. For instance, there are two phone makers with approximately 25% market shares—Samsung and Apple. If the QIPS application were installed on all the phones in the installed base of either manufacturer, there would be a specified chance of having an app-equipped phone in a queue of 10 people.

Measuring Phone-to-Phone Distances

The QIPS phone 601 may approximate the distance to each Bluetooth enable device signal by measuring the signal strength of each signal using Radio Signal Strength Indicator (RSSI). While such RSSI measurements are effected by such measured signals passing through human bodies, walls, and other obstructions, in general, a pretty good approximation of phone-to-phone distance can be obtained. When determining the distance from phones or devices, the distance may be skewed when a single person is carrying multiple phones and/or devices.

RSSI is calculated by using the intermediate frequency (IF) stage before the IF amplifier in the radio portion of the Bluetooth 606 or WiFi chip 607. In zero-IF systems, it is done in the baseband signal chain, before the baseband amplifier. RSSI output is often a DC analog level. It can also be sampled by an internal ADC and the resulting codes available directly or via peripheral or internal processor bus to the programming interface.

In order to calculate the distance between nodes using Bluetooth Low Energy (BLE), the Received Signal Strength Indicator (RSSI) value is pulled from the standard BLE interface. In an Android operating system, the value is provided by the getShortExtra function as seen below.

rssi=intent.getShortExtra(BluetoothDevice.EXTRA_RSSI,Short.MIN_VALUE);

The RSSI value is a logarithmic number in decibels that indicates the strength of the received signal. It is typically a negative number with a typical range of −100 dB to 0 db. In a Texas Instruments CC2420 it has an accuracy of −6 dB. RSSI is calculated as follows $$rssi=(-10*n)*\log(d)+A$$

according to Qian Dong and Waltenegus Dargie from the Technical University of Dresden, Germany (hereafter "Dong") in their paper "Evaluation of the reliability of RSSI for Indoor Localization". Taking this formula and converting it algebraically to determine d, we have:

$$d=10^{\wedge}((A-RSSI)/(10*n))$$

Where d is the distance in meters between the transmitter and receiver. A is the power used for transmitting in dBm, with −45 dBm being the default transmit level, although the user can adjust the transmit power in BLE. RSSI is the received signal strength value returned by the BLE physical layer in dBm. The constant n is the signal propagation constant, typically 2 for transmissions through the air. A wall can reduce the signal power by 3 dBm on average.

While Dong is concerned about the accuracy of RSSI in the determination of distance, his data shows that additional readings improve accuracy. The present invention allows time for more samples that Dong, allowing for better information than Dong. In addition, our invention does not require complete knowledge of distance, just a close approximation of a number of proximate devices so that the density of the queue and the serving times can be calculated. RSSI provides good enough data for our purposes. We also expect that as BLE technology improves, the accuracy of distance calculations based on RSSI will improve.

In addition to using RSSI to determine distance between devices, various time of flight algorithms could be used to determine the distance between phones. In these algorithms, the time for radio waves to transmit between a transmitter and a receiver is measured, and transformed into a distance.

In addition, radar could also be used to detect people in a queue. Google is developing a Radar chip that could be used to see people around a smart phone, if the chip were embedded in the phone. By determining the number of people and their arrangement, the radar chip could determine the size of a queue surrounding the phone.

Deducing Direction from a Single User's Phone

Furthermore, it is generally know how such an RF detector, in this case the user's phone 601, when put in motion, can approximate the direction such a signal is coming from. Deducing such a direction, assumes that the emanating source is not moving much relative to the movement of the sensing device thus allowing standard triangulation techniques to be used to determine position. For instance, see U.S. Provisional Patent application 62/034,747, "Finding Devices Using Cell Phone Sweeping".

Using the principles of RSSI and triangulation, a single phone held by a user moving about in direction at least partially perpendicular to the line between the user and the phone being monitored, could approximate the relative direction of the monitored phone. When combined with the RSSI measurement of distance, the monitoring phone would have a reasonable estimate of the location of the monitored phone.

Deducing Direction to Another Phone Using Multiple Phones

Using two phones that have the QIPS app installed would make it easier to establish the location of a given monitored phone as neither of the monitoring phones would necessarily need to move in order to approximate the direction to a given monitored phone. Each phone would perform an RSSI distance-approximation to the monitored phone and use triangulation to deduce the distance and direction (thus location) to the monitored phone.

Deducing Queue Status with QIPS

When a location approximation has been done to each phone 610-613 that is in the vicinity of the user's phone 601, an approximate map of nearby phones may be constructed. Snapshots of such a map could be made over time creating a data stream similar to a weather radar map. Combining such map snapshots with information concerning approximately where inside a particular venue the user was, and where inside such a venue queues are likely to form, a reasonable assessment of queue status may be made.

Such queue status information would include the size of the queue, the location of the app user or users in the queue, how fast the queue may be moving, the number of service people working (see below), and whether anybody is leaving the queue. A user's accelerometer 604 would be able to discern when the user left the queue as the user would be seen to be walking away quicker then the motion seen shuffling along in a line.

Identifying Queue Characteristics with BLE

Once QIPS has detected the surrounding devices (e.g. smart phones 610-613) and noted their approximate distances, the system can analyze the perceived location of close-by phones and construct an approximate map of such phones. Combined with the previously deduced location of the user within the venue, a more accurate probability can then be formed as to whether the user is in a queue. The map provides the characteristics of such queue. The map would be updated periodically in order to watch how the queue behaved over time. Note that as the map was updated, the app would be able to watch and track individual phones as they moved as each has a unique BLE identifier.

The server would be continuously updated with queue information as produced by the app-enabled phone 601 thus allowing such information to be distributed to others interested in the queue characteristics of the venue in real time. The exact frequency of such updates would balance battery use by the phone and the perceived need for such information and related accuracy.

For purposes of this description multiple queues will be considered. The linear queue such as the one that forms outside a popular ice cream stand. The wrap-around queue like the one that might form at the ticket window of a theater or bank lobby. The clustered queue that forms around the hostess stand at many restaurants.

User Feedback and System Calibration

Users would be prompted from time-to-time to confirm QIPS' estimates of queues and crowds, queue locations, and other deductions made by the system in order to better calibrate the estimates.

Users would also be able to voluntarily submit such information in order to improve the system. Some voluntary contributions might be disregarded in order to maintain a random nature to the calibrations (as user might only be self-motivated to volunteer information under unusual circumstances. Alternatively, an incentive system might be put in place to ensure that prompts are carried out in order to keep their random nature intact.

Another avenue of crowd-sourced information would be the Venue Database 631, which would always be improved by any sort of accurate user contribution. Again, an incentive system to encourage such contributions would be advantageous.

Server vs Phone Processing

Calculations such as those involving triangulation and RSSI measurements might be most "economically" done in the cloud by transmitting the relevant data to a cloud server 630 over the internet 620 using either Wi-Fi 607 or the phone cellular connection 605. However, either phone based or cloud based embodiments of processing of the calculations is envisioned.

In one embodiment, the QIPS App could assemble a data structure of information on the time of the measurement, the location (or distance from the user's phone 601 and the remote phone 610-613), and the mac address of the remote phone 610-613. For instance, an array of records may look like:

struct
    {
      TIME time; //the date and time the data was collected,
        including seconds
      LOCATION place; //the location where sample is taken,
        pref within 10-20 cm
      MAC address; //MAC address or similar of device found
        in the queue
    }

In addition to the transmission of the above array to the cloud 630, the user's phone 601 also needs to transmit its location so that the server 630 can know where the queue is located.

From this information we can derive queue size, and service time, assuming that the data is collected at least every 10 seconds. Sampling every second or so will increase the accuracy of the queue time, but requires a 10× increase in storage and data traffic. To optimize data traffic, use UDP rather than TCP to eliminate the overhead and the message ACKs.

If we upload location information to the cloud 630, our upload will be in the range of 1 Mbyte of data per location per day. Take 32 bytes of location, identification, and time data at 30 second intervals means 64 bytes per minute. Assuming 20 people in the queue, or 1280 bytes per minute. Assuming 10 hours per day (600 minutes), we get 768,000 bytes.

With this information, data is sufficient to determine:

Who was at the location/in queue. Because each MAC address is recorded with a time stamp, the data collected in the cloud will know who was at the location and at what time. This may be useful for crime tracking, who was at a work location when and for businesses to know who their customers are.

How many were at the location/in queue. This is interesting to both the business hosting the queue and to its competitors. It could also be used to notify those considering joining the queue as to how many are in attendance.

How long they were at the location/in queue. This is also interesting to the business and its competitors, but is most interesting to those approaching the queue, so that they can determine if they want to wait in the queue.

Queue Size.

Queue Time of Service. This metric tells the business (and its competitors) how fast the servers at the head of the queue are able to process each customer.

Queue Time. Total Time in the Queue.

Time at the establishment. This metric shows how long each customer is in the restaurant or other establishment. This includes queue time, service time, and time after being served, perhaps eating in a restaurant.

Staffing. The staff can be determined because these are the MAC addresses that do not leave the establishment during a work period. This may be useful to competitors to analyze staffing levels.

Shift length for staff. By knowing the staffing, the shift lengths for each can be calculated. This information may also be useful for competitors.

How many hours each staff stayed on site. Similar to shift time.

Where worked. The data should be able to detail where each worker spent their time, outlining how many were at the head of the queue serving and how many were in the background.

All of this information can be used for time efficiency studies based on this type of tracking. In general, since the information is based on MAC addresses, the data is relatively anonymous. However, an employee/user could be used to provide their MAC address so that a name could be associated with the MAC address. There are other techniques to determine identity of a user, perhaps through an App or other way of querying the user.

Home Monitoring

Another embodiment uses the BLE beacon in an alarm system to track and record which MAC addresses are in an alarmed area. This allows for the taking of attendance in the home. For latch-key children, this allows the parents to see when the children arrive home and who is home with them. By checking all phones entering the home, each child, and each friend is recorded. Using RSSI, the location in the house can also be monitored. Using a shielded or directional antenna we can determine who is entering and who is leaving.

Parking

To figure out parking at a venue we look at the amount of time someone walks from their car to see how far away they are parking. This data could also be used to figure out which parking spots were opening up by tracking people walking back to their cars. The invention would use the cell phone carrier data to find where drivers transition from walking to driving.

Information on parking lot abandonment rates could be important for other drivers. With this information a driver could know to avoid a lot that is filed based on the abandonment rate. For instance, treat a parking garage (such as at the airport) as a black box and track who enters and leaves. Abandonment shows that the lot is full, but a running count could also be tracked to estimate how full the lot is.

Amusement Park

For a Ferris Wheel, we could take a count of the number of people in the area and subtract the count of the people on the Ferris Wheel to get the size of the line. We can also fine queue time by subtracting the enter time from the exit time. We can also calculate the ride time and the ratio of the ride time to wait time (work to rush ratio).

Assessing the Work Force

Often there would be phones that appeared close to the queue but that did not move. Over time, given the stability of these signals, these would be considered workers handling the queue under examination. Their signals would then be filtered out. Over time, the QIPS would see the same BLE signals associated with worker phones and be able to thus determine the workforce composition more quickly.

Typical workforce loads would be entered as metadata in the Venue Database thus allowing later queue assessments to be done quicker as this "background noise" could be assumed to exist before being empirically measured and subtracted out.

Besides filtering out the worker BLE signals from the queue signals, gathering workforce information in and of itself might have value. For instance it might be useful for a third party to understand workforce stability or turnover in a competitor's location. Or the raw number of workers apparently employed at a venue. The data could be gathered as a bi-product of QIPS' queue assessment or a separate task by the app.

Crowd Assessment

Some venues would be denoted as "crowd-likely". These venues may or may not have lines. An example might be a movie theatre where there might be lines at the ticket window and popcorn stand, but a given screen within the theatre may or may not have a lot of people sitting down. A beach, however, might have no queues but the crowd density at the beach might be of interest to someone going to the beach. Likewise, a bar crowd might be of interest to a prospective patron.

In a crowd-likely venue (a "CLV"), the app user's phone would seek to take a census of how many other phones were within certain distance ranges. Thus, if a user went into a theatre screen and sat down, an approximate head count could be made of how many people were in that room. BLE signals might be detected from adjoining rooms but their signals might be greatly diminished, and therefore such signals might be disregarded.

In any case, a headcount might be taken of phones within a shorter radius than the distance to a wall. Such "local density" might used as a proxy for overall density in the room.

In other cases, density information is less desirable then an overall headcount. For instance, it might be useful to know how many participants there were in a seminar. If BLE signal leakage from adjoining rooms was not too significant, such a headcount would be able to be performed and reported to the cloud. Headcount is sometimes relative. At a beach, 5000 people may be a small crowd whereas 5000 people at a bar indicates a huge party. Historical information is necessary to put the headcount data in to context (for instance, the QIPS application could display data similarly to weather radar information, providing both historical information and a prediction of the future). Average count and maximum count are important, but may not be enough. We need to put the data on a curve, and compare the data on a relative basis. This needs an intelligent algorithm that ignores night data and also looks at density at a specific location. In a restaurant, historical data is important. For instance, the wait for a table to open up at 6 PM is longer than at 8 PM, when many people are getting up to leave.

As with queue information, crowd density information would be assembled and reported to the cloud over time, and associated with the relevant venue. As with the queue characterizing described above, over time the QIPS system would attempt to determine the size of, and the BLE signals comprising the "workforce" at the venue, and thus subtract this from the assessed crowd information.

In addition to assessing the crowd characteristics of public venues, QIPS could be used to assess crowd characteristics at a private venue, for instance a private residence having a party. In such a case, the "venue manager", in this case, the party-thrower would consent to have such information gathered at his or her venue. This would allow prospective party-goers to see how well a party was developing.

Such opt-in by the party-goer would only be necessary if QIPS precluded the collection and dissemination of crowd (or queue) information for locations that were not in the Venue Database, which would only include public spaces.

Standing Room Only & Phone Carrying Habits

In some venues it might be useful to know if there was standing room only. Given that men typically carry their phone in their pocket, the orientation of the phone as determined by the app could provide a strong clue as to whether the person was sitting (with the phone likely close to horizontal) or standing (in which case the phone would probably be vertical). In addition, while standing, the phone is likely to be swaying within a small space as the users shuffled their feet while standing.

For women, who more typically carry their phones in a purse, the horizontal orientation would typically be the same whether the purse was being held or set down. But the swaying of the bag would provide a similarly strong clue that the woman was standing.

Such standing versus sitting information could be used to predict whether a venue was crowded enough to be at standing room-only status. For a venue such as a bar, it could be used to predict in a relative way how many patrons were standing versus sitting. Such predictions would increase in accuracy as the percentage of app-equipped phones increase.

A further crowd related prediction could be made concerning gender. If men and woman typically carry their phones in different manners, and the app was not so intrusive as to ask for the user's gender or name (which could be used to deduce gender) than the phone-carrying method used by an app-user could be used to predict gender. Such gender information could be of interest when trying to characterize a crowd at a bar or party.

More fundamentally, phone-carrying habits could be used to establish the gender mix of the population using the app itself.

Using the Queue Information

The queue information could be available to anybody over the Internet. Access could be in exchange for being an app user, paid for outright, or supported by advertising.

To access up-to-date queue or crowd information a user might use a service such as Google Maps. When a close-up view of a map revealed a public venue, an icon might show a summary of QIPS information while clicking on the icon might show additional information.

In addition, color coding or some other form of visual communications might indicate at a glance the current queue status.

A map-free alternative might distribute the information via a service such as Siri, where Siri would pull the information directly from the QIPS database. In other cases, websites and apps such as Yelp, could use a QIPS API to display real-time queue information on their site.

A QIPS website might also allow for direct access of the Venue Database 631 or allow it to be searched and sorted by queue status.

QIPS would also access its historical model and correlate it with the metadata to uncover queue relationship such as the fact that the beach is the most crowded when high tide comes at 11:00 a.m. It would use this historical information, combined with its current and recent data to put together forecasts, much like meteorologists do.

Users of QIPS data could be presented with current data or forecasted data or both much as weather reports are. QIPS could also receive information regarding the time a person might be arriving at a venue and give a more targeted and detailed forecast for that time.

QIPS could also estimate the service time per patron by watching the turnover in the queue over time. The length of the queue inclusive of service time could also be documented by the time that an app user apparently spent in the queue.

Search Choices

A user could at times, whether it be through Yelp, or a dedicated QIPS app, a list of alternative venues and their wait times. For instance, such a list might show all the coffee shops within three city blocks and their queues and crowds. Such information might also be available to the businesses themselves. QIPS could in such cases, offer a system (potentially automated) allowing a business to offer a queue-related coupon. For instance, if a Starbucks line was too long a coupon could be presented on the users phone to compensate such a user for waiting in such a long line. On the other hand, a Dunkin' Donuts across the street might offer its own coupon attempting to lure the user over given that it is in need of customers.

Predicting Queue Behavior

Sensors would then note the user moving in a slow shuffle as the line moved along. Such a motion would be totally linear if the line was in a long string, or there might be periodic 180 degree, or similar, turns if the line wound around. The updated map of surrounding phones would also show movements similar to those being supported by the user.

Upon being serviced (e.g. buying the tickets at a theatre), the user's pace would pick up again. At this point the length of time the user spent in line would be recorded and sent to the database, and the user would either head to a seat (where the accelerometer would sense many footsteps followed by a sudden two-foot drop as the user sat down) or get into the food line, where the queue measurement process would start all over again.

The information gathered from QIPS could be used by businesses to determine their customer satisfaction by determining wait times. For instance, a business could adjust their staffing based on historical queue depths at various times. Or a business could use the wait time data to compensate users for unexpectedly long wait times. In this situation, the business could automatically issue a coupon to users who wait in line more the 5 minutes.

Alternatively, businesses could use the QIPS data to gather intelligence on their competitors. Length of queues, service times, and staffing levels are valuable competitive information, and could allow a business to entice customers choose to abandon a long queue for another business.

DETAILED DESCRIPTION OF THE DRAWINGS

Figure 1A:
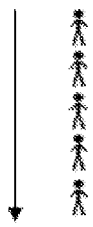
FIG. 1A illustrates a straight queue.
Figure 1B:
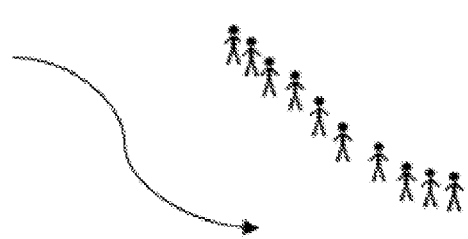
FIG. 1B illustrates a curved queue.

FIGS. 1A, 1B, 1C and 1D each show different types of queues. FIG. 1A illustrates a straight queue. FIG. 1A represents an ideal queue where only one line exists and each person is evenly spaced throughout the line. As each person moves through the queue FIG. 1B illustrates a curved queue. In a curved queue the spacing in between persons will likely vary. Curved queues have different navigation directions for each person in the queue.

Figure 1C:
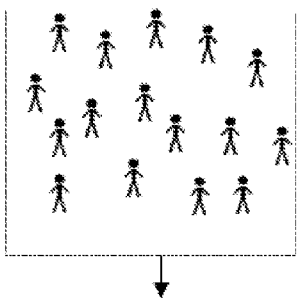
FIG. 1C illustrates a queue with no clear organization.

FIG. 1C illustrates a crowd queue. A crowd queue is commonly seen in the front of restaurants or outside of venues that are about to open for general admission. In a crowd queue there is no pattern for navigation to be used to determine the exact order of the people in the queue. QIPS may simply determine the number of persons in the crowd area by using the signal strength of surrounding signals for a given area. Aggregating the total number of signals in a crowd area above a threshold signal strength may result in an accurate headcount of the queue.

Figure 1D:
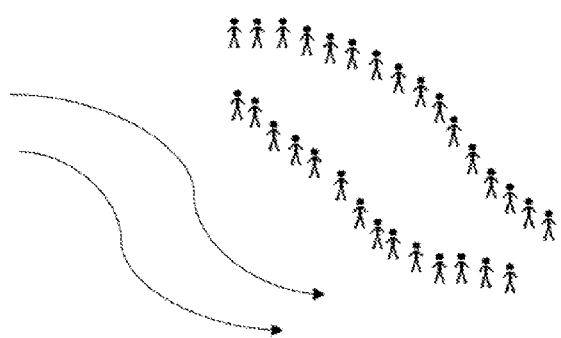
FIG. 1D illustrates a multi-line queue.

FIG. 1D illustrates a multi-line queue. It is important to note the distance between each person in any of these lines will be similar although the orientation of each person may be different along the curves of each line. The trouble with multi-line queues is the difficulty in determining the number or people in each line. Inertial navigation and grouping of persons in the same line may allow QIPS to accurately calculate the number of persons in each queue. Without clear separation of each queue when there are multiple queues may result in different distance approximations from the back of the line to the front of the line. However, clear separation of the persons from each queue will provide more accurate results.

Figure 2:
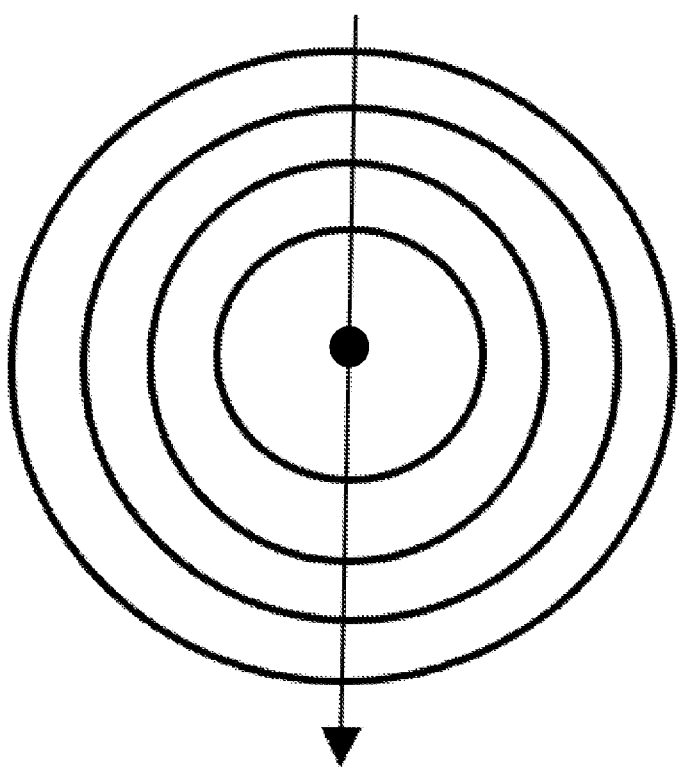
FIG. 2 illustrates the signals given off in a straight queue with almost evenly spaced people.

FIG. 2 illustrates the signals given off in a straight queue with almost evenly spaced people. In an evenly spaced straight line queue each person will have the same distance Z between the person directly in front of them and the person directly behind them. Similarly, the person two people in front of any given person or two people behind that same person would be at a distance 2Z. The distance may be calculated between each unique device. Unique devices may be determined from each device's identifier (e.g. BD_ADDR). By calculating the distance between devices the number of people within a line may be determined. Alternatively, a central network hotspot, such as a Bluetooth beacon or a Wi-Fi antenna may determine distances representative of people waiting in a queue. FIG. 2 is an idea illustration of a single queue where people are evenly spaced.

Figure 3A:
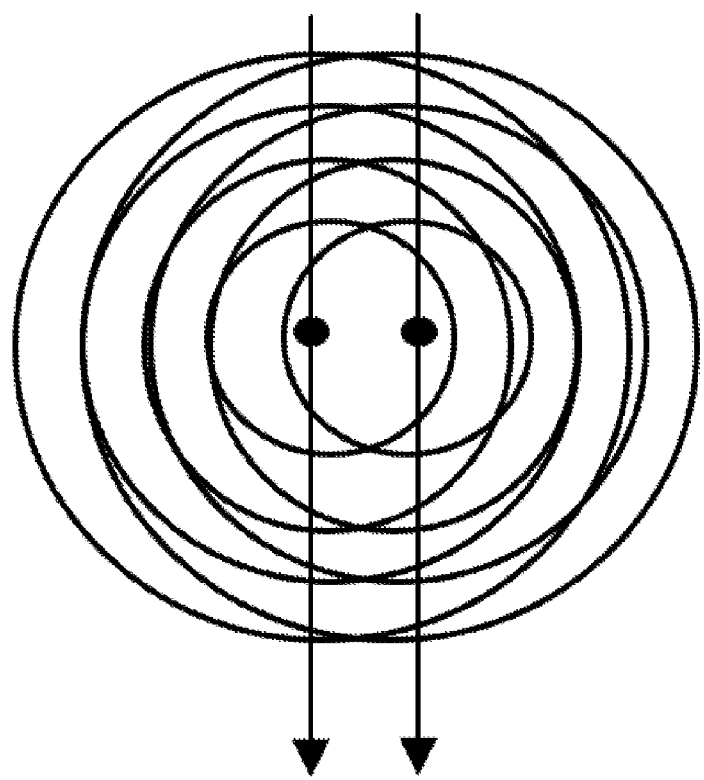
FIG. 3A illustrates the signals given off by two parallel queues.

FIG. 3A illustrates the signals given off by two parallel queues. In this figure, the first queue has people spaced by a distance Z but in addition a second queue is located a distance Y away. The person in front of line of first queue and the person in front of the line of the second queue are a distance Y from each other. The person in front of the line of the first queue is a distance Z from the second person in the first queue. Each queue may perform the same service so that a customer may choose either line and undergo the same wait time. For example, two queues may be present inside of a fast foot establishment. A customer may choose either line and receive the same service. If QIPS is calculating the distance between the people in line and Y is equal to Z then it may be hard to discern between the wait times of each line without additional information. In this example, a Bluetooth beacon within the fast food establishment may calculate the distance of each device using RSSI to discern between the two queues.

Figure 3B:
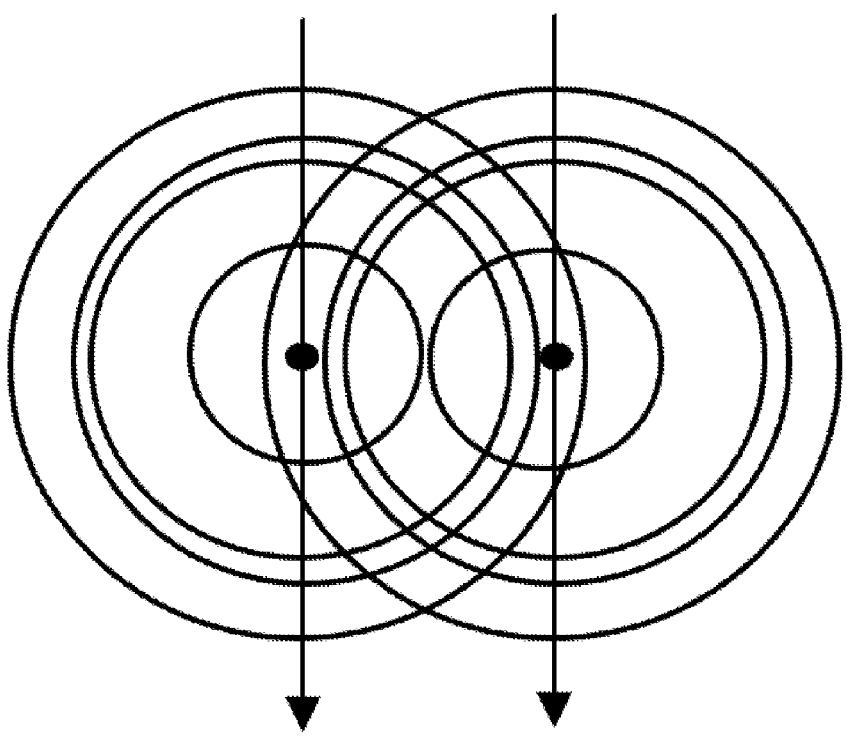
FIG. 3B illustrates the signals given off by two parallel lines with unevenly spaced people.

FIG. 3B illustrates the signals given off by two parallel lines with unevenly spaced people. When people are unevenly spaced within two separate lines it may not be useful to calculate the distance between devices in this scenario. Alternatively, two lines may have additional people standing around that are proximal the lines but not actually waiting for service. In this scenario a different method for calculating the queue time should be employed. For example, QIPS may take the total number of devices in the area and asses an estimated wait period based on the number of people in the area, the number of people leaving the area over time, and the number of people entering over time. Since an accurate instantaneous queue time may not be assessed QIPS may rely solely on the probability of the queue time.

FIGS. 4 A, B, C, and D illustrate the information available to the app on the user's cell phone A1 as the user moves through the queue. From the point where the user A1 is located, the phone can see distance in all directions, but without any direction information, so distance is seen as a circle from the point in which the phone A1 is located.

In FIG. 4A, we assume for purposes of this example that there are three others Q1, Q2, and Q3 in the queue besides the user A1. The cell phone sees the distance of each other device in the queue Q1, Q2, and Q3. Each are a distance from A1, and represented as a circle from A1. At the point of entry to the queue, the only way we know the direction of the queue is from compass information on the direction the user approached the queue and information on which device we saw first as we approached the end of the line.

In FIGS. 4B and 4C, the user moves forward in the queue, with Q1 leaving the head of the queue and new device Q4 entering (or Q2 and Q5 for FIG. 4C, respectively). Notice that the circles for Q3 and Q4 are on top of each other and probably indistinguishable. This is because they are both equidistant from the user but in different directions. The order, if we need to know it, will come from the historical information on who entered the queue first.

FIG. 4D illustrates the head of the queue. The App on the cell phone can determine that this is the head of the line because of the lack of overlapping circles. Because everyone is in the same direction, behind the user, we know everyone's distance. Direction must be determined based on compass information from the direction that the user has walked or from historical information.

FIGS. 5A, 5B, 5C, and 5D illustrate the information available to the app on the users' cell phones A1 and A2 as the users move through the queue. From the point where the user A1 is located, the phone can see distance in all directions, but without any direction information, so distance is seen as a circle from the point in which the phone A1 is located.

In FIG. 5A, we assume for purposes of this example that there are three others Q1, Q2, and Q3 in the queue besides the user A1. The cell phone sees the distance of each other device in the queue Q1, Q2, and Q3. Each are a distance from A1, and represented as a circle from A1. At the point of entry to the queue, the only way we know the direction of the queue is from compass information on the direction the user approached the queue and information on which device we saw first as we approached the end of the line.

In FIGS. 5B and 5C, user A2 has now entered the queue. Both user A1 and user A2 will move forward in the queue, with Q1 leaving the head of the queue and new user A2 entering (or Q2 and Q5 for FIG. 4C, respectively). Notice that the circles for Q3 and A2 are on top of each other and probably indistinguishable. However, since user A2 is recognizable by user A1, the cell phones may use inertial navigation or triangulate position. The order of the queue may come from the historical information on who entered the queue first.

FIG. 5D illustrates the head of the queue. The App on the cell phone of user A1 can determine that this is the head of the line because of the lack of overlapping circles. The App can calculate how many people are in between user A2 and the front of the line. Because everyone is in the same direction, behind the user, we know everyone's distance. Direction must be determined based on compass information from the direction that the user has walked or from historical information.

Although the present disclosure has been described with reference to example embodiments, those skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

The invention claimed is:

1. A method of electronically predicting queue characteristics of a queue of humans, the method comprising:
   broadcasting a query from an originating smart phone to one or more receiving smart phones;
   analyzing, on the originating smart phone, responses from the receiving smart phones to determine signal characteristics of the responses;
   converting the signal characteristics into a distance between the originating smart phone and the receiving smart phones;
   storing an array of the distances and identifications of the receiving smart phones;
   sending a location of the originating smart phone and the array of distances and identifications of the receiving smart phones to a cloud server for reporting a total count of smart phones at the location to predict a queue length;
   calculating a queue wait time by using the total count of smart phones at the location and analyzing changes in the array of distances between the originating smart phone and the receiving smart phones over time; and
   repeating the broadcast, analysis, conversion, storage, and sending on a periodic basis.

2. The method of claim 1 wherein the query is broadcast using a Bluetooth protocol.

3. The method of claim 1 wherein the query is broadcast using a Wi-Fi protocol.

4. The method of claim 1 wherein the signal characteristics include the receiving signal strength.

5. The method of claim 1 wherein the signal characteristics include a time of transmission of a radio signal.

6. The method of claim 1 further comprising detecting movement with an accelerometer on the originating smart phone and repeating the broadcast, analysis, conversion, storage, and sending when a movement pattern that matches walking is detected.

7. An apparatus for predicting a human queue, comprising:
   a special purpose processor;
   a memory electrically connected to the special purpose processor;
   a cellular transceiver electrically connected to the special purpose processor;
   a wireless transceiver electrically connected to the special purpose processor;
   a display screen electrically connected to the special purpose processor;

a queue monitoring application executed on the special purpose processor;

wherein the queue monitoring application determines a distance between the apparatus and one or more remote smart phones through a broadcast of a broadcast message to the remote phones, using the wireless transceiver, receives signal characteristics from one or more reply messages received from the one or more remote smart phones, predicts a queue length using a total count of smart phones that replied to the broadcast, calculates a queue wait time based on the total count of smart phones that reply to the broadcast and on changes in an array of distances between the phone and the remote phones over time, and sends a reporting message containing the queue length, the queue wait time and the array of the distances, through the cellular transceiver to a remote server.

8. The phone of claim 7 wherein the wireless transceiver is a Bluetooth transceiver.

9. The phone of claim 7 wherein the wireless transceiver is a Wi-Fi transceiver.

10. The phone of claim 7 wherein the signal characteristics include the receiving signal strength.

11. The phone of claim 7 wherein the signal characteristics include the time of transmission of a radio signal.

12. The phone of claim 7 further comprising an accelerometer electrically connected to the special purpose processor where the queue monitoring application only executes when the accelerometer reads patterns associated with a human walking.

13. The phone of claim 7 wherein the array further includes identifying information related to the remote phones.

14. A system for reporting queue characteristics of a queue of humans, including a smart phone and a cloud server, the system comprising:

the smart phone comprising:
a special purpose processor;
a memory electrically connected to the special purpose processor;
a cellular transceiver electrically connected to the special purpose processor;
a wireless transceiver electrically connected to the special purpose processor;
a display screen electrically connected to the special purpose processor;
a queue monitoring application executed on the special purpose processor;

wherein the queue monitoring application determines a distance between the apparatus and one or more remote smart through a broadcast of a broadcast message to the remote phones, using the wireless transceiver, receives signal characteristics from one or more reply messages received from the one or more remote smart phones, predicts a queue length using a total count of smart phones that replied to the broadcast, calculates a queue wait time based on the total count of smart phones that reply to the broadcast and on changes in an array of distances between the phone and the remote phones, and sends a reporting message containing the queue length, the queue wait time and the array of the distances, through the cellular transceiver to the internet and further to the cloud server;

the cloud server comprising:
one or more special purpose cloud processors for high speed processing of data messages;
an internet transceiver electrically connected to the special purpose cloud processors;
a database electrically connected to the special purpose cloud processors;
wherein the reporting message from the smart phone is received by the internet transceiver and passed to the cloud processor for storage in the database.

15. The system of claim 14 wherein the wireless transceiver is a Bluetooth transceiver.

16. The system of claim 14 wherein the wireless transceiver is a Wi-Fi transceiver.

17. The system of claim 14 wherein the signal characteristics include the receive signal strength.

18. The system of claim 14 wherein the signal characteristics include the time of transmission of a radio signal.

19. The system of claim 14 wherein one or more of the cloud processors analyze the distance data in the database to determine queue length at a location of the smart phone.

20. The system of claim 19 wherein the cloud processors send a message containing the queue length at the location of the smart phone at a point in time to a remote device on the internet.

* * * * *